US 6,667,769 B2

(12) United States Patent
Harton et al.

(10) Patent No.: US 6,667,769 B2
(45) Date of Patent: Dec. 23, 2003

(54) TIME INTEGRATING PIXEL SENSOR

(75) Inventors: Austin Harton, Oak Park, IL (US);
Francisco Castro, St. Charles, IL (US);
Barry Herold, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 72 days.

(21) Appl. No.: 10/012,947

(22) Filed: Dec. 10, 2001

(65) Prior Publication Data

US 2003/0107666 A1 Jun. 12, 2003

(51) Int. Cl.[7] .......................... H04N 3/14; H04N 5/335
(52) U.S. Cl. .................. 348/308; 348/297; 348/302
(58) Field of Search ....................... 348/294, 295, 348/297, 302, 308

(56) References Cited

U.S. PATENT DOCUMENTS

| | | | | | |
|---|---|---|---|---|---|
| 5,565,915 | A | * | 10/1996 | Kindo et al. | 348/308 |
| 5,877,715 | A | * | 3/1999 | Gowda et al. | 341/122 |
| 5,920,274 | A | * | 7/1999 | Gowda et al. | 341/155 |
| 6,330,030 | B1 | * | 12/2001 | O'Connor | 348/297 |
| 6,377,303 | B2 | * | 4/2002 | O'Connor | 348/308 |
| 6,529,240 | B2 | * | 3/2003 | Tan et al. | 348/302 |
| 2002/0122129 | A1 | * | 9/2002 | Lee | 348/308 |

* cited by examiner

Primary Examiner—Andrew Christensen
Assistant Examiner—Eric Wisdahl
(74) Attorney, Agent, or Firm—James A. Lamb

(57) ABSTRACT

A time-integrating pixel sensor having a photo-detector, a capacitor, a comparator and a pixel data buffer. In operation, the photo-current from the photo-detector charges the capacitor and produces a photo-voltage. The photo-voltage sensed by the capacitor and a reference voltage is compared with the comparator. If the photo-voltage exceeds the reference voltage, a global code value is latched into the pixel data buffer. The optical power falling on the photo-detector is determined from the latched code value. An array of sensors is incorporated into a semiconductor device together with circuitry to read and decode the pixel data buffers. The reference voltage may be varied in time to increase the dynamic range of the sensor.

6 Claims, 5 Drawing Sheets

TIME INTEGRATING PIXEL SENSOR

TECHNICAL FIELD

This invention relates generally to techniques and apparatus for image sensing, and more particularly to a method and apparatus for obtaining a digital measurement of a photo-current.

BACKGROUND OF THE INVENTION

A major problem in imaging is the limited dynamic range of image sensor arrays. As a result, some portions of the image may be saturated while other portions are under exposed. A typical photodiode optical detector, such a charge-coupled device (CCD), consists of an array of pn junction photodiodes. Each photodiode has a capacitance associated with it, and when light falls on the detector the resulting photo-current charges the capacitance. The charge is thus the time integral of the light intensity falling on the detector. The CCD periodically and sequentially switches the charge to a video line, resulting in a series of pulses, which can be converted into a voltage signal representing the light pattern incident on the array. If the integration time is too long, the device will saturate. If the integration time is too short, the voltage signal will be lost in the noise of the device.

One approach to adjusting sensitivity is therefore to adjust the integration time according to the intensity of light falling on the array. This can be done globally for the whole array by adjusting the switching rate, for example. This allows the array to adjust for various light levels (as in adjusting the exposure time of an analog camera), but does not increase the dynamic range within a single image.

Another approach is to measure the time taken for the capacitor voltage to reach a reference level. An example of such a system is given in "Intensity Mappings Within The Context Of Near-Sensor Image Processing", by Anders Åström, Robert Forchheimer and Per-Erik Danielsson, IEEE Transactions on Image Processing, Vol. 1, No. 12, December 1998. A large time indicates a low intensity of light falling on the array, while a short time indicates a high intensity. The voltage reference level is common to the whole array, but may be adjusted according to the overall intensity falling on the array. This approach is computationally intensive, since the integration time is measured by interrogating the output from a comparator at predetermined intervals. These intervals need to be very close together for accurate measurement. This approach also requires each pixel to have a readout circuit. In addition, each sensor element requires a precharge transistor.

A further device called a "Locally Autoadaptive TFA Sensor" is described in "High Dynamic Range Image Sensors In Thin Film On Asic Technology For Automotive Applications", by M. Böhm et al., in *Advanced Microsystems for Automotive Applications*, D. E. Ricken, W. Gessner (Eds), Springer Verlag, Berlin, pp 157–172, 1998. In this device, the integration time is adapted for each individual pixel according to the local illumination intensity. The capacitor voltage is compared after an initial integration time to a reference voltage that is slightly less than half of the saturation voltage. If the voltage is less than the reference voltage, the integration time is doubled. This process is repeated until the reference voltage is exceeded. Thus, saturation of the capacitor is avoided and the integration time is extended to avoid under exposure. The final voltage and the integration time are together used to determine the illumination intensity. This approach requires circuitry to compare and adjust the integration time and circuitry to measure the voltage at the end of the integration time.

In light of the foregoing discussion, it can be seen that there is still a need in the art to have image sensor arrays resulting in an image representative of the intensity distribution of an object such that portions of the image are not saturated or underexposed.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
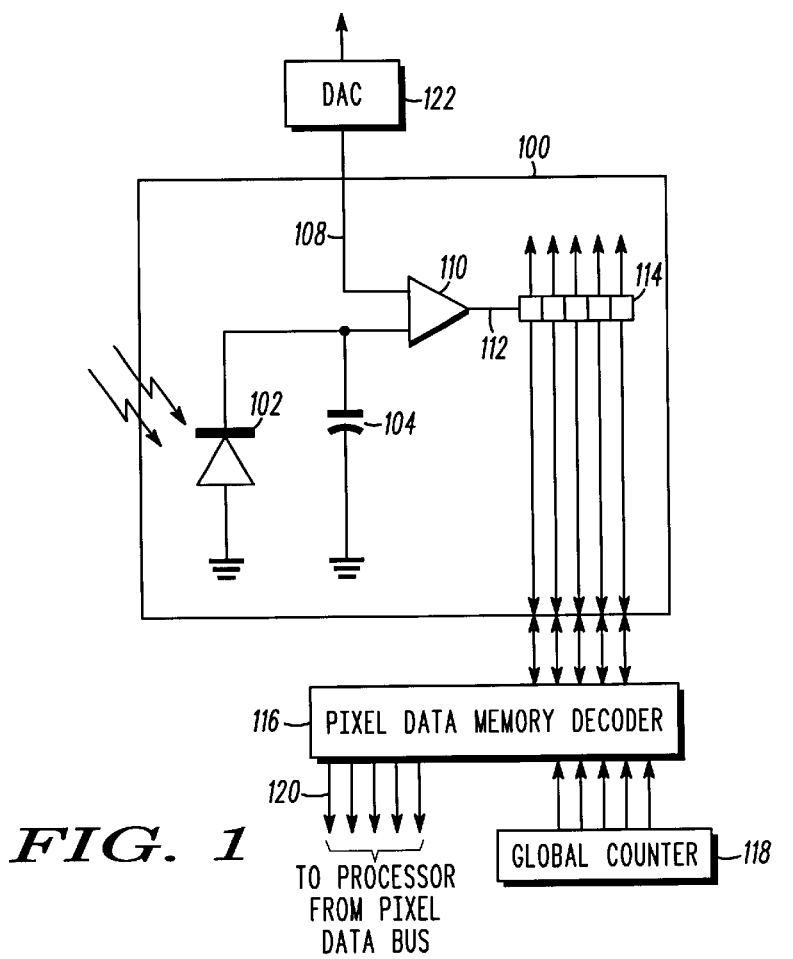
FIG. 1 is a block diagram of a photodiode sensor, in accordance with an aspect of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a time-integrating pixel architecture 100 of a preferred embodiment of the invention is shown. The pixel architecture 100 comprises a photo-detector 102 and a floating diffusion capacitor 104 with capacitance $C_{fd}$. In operation, the photo-current charges the floating diffusion capacitor and produces a photo-voltage 106. The charge is allowed to move directly from the photo-detector to the diffusion capacitor without the use of a transfer gate. The photo-voltage 106, sensed by the floating diffusion capacitor, and a reference voltage 108 are supplied as inputs to comparator 110. If the system is reset at time t=0, the voltage V across the capacitor at time t is the time integral of the photo-current i, which is given by:

$$V = \frac{1}{C_{fd}} \int_0^t i(\tau) \cdot d\tau = \frac{it}{C_{fd}},$$

where $C_{fd}$ is the capacitance of the floating diffusion capacitor and t is the integration time of the capacitor. The photo-current is given by:

$$i = \frac{PeQE\lambda}{hc},$$

where P is the illumination intensity, q is the charge on an electron, $\lambda$ is the wavelength of the light, c is the speed of light, h is Planck's constant and QE is the quantum efficiency of the photo-detector. Hence the voltage across the capacitor is related to the integration time:

$$V = \frac{PqQE\lambda t}{C_{fd}hc} = \frac{P}{K}t,$$

where $$K = \frac{C_{fd}hc}{qQE\lambda}$$

is a constant. For an illumination intensity $P_i$, the time to reach the reference voltage $V_{ref}$ is:

$$t_i = K\frac{V_{ref}}{P_i}.$$

That is, after an integration time $t_i$ the photo-voltage 106 sensed by the floating diffusion capacitor and the reference voltage 108 are equal. In the pixel architecture shown in FIG. 1, a global counter or code generator 118 is reset at time t=0. When the photo-voltage 106 exceeds the reference voltage 108 for a particular pixel, the output 112 from the comparator 110 changes value. At that time the global counter value or code value is latched and stored in the associated pixel data buffer 114. Latching the counter or code values avoids the need to interrogate the comparator output. In the preferred embodiment, the counter or code value is stored as a 10-bit value in the pixel data buffer 114. However, different size buffers may be used. Generally, larger buffers are more expensive but provide greater accuracy. One latch is used for each bit in the buffer and is assumed in the figure to be an integral part of the buffer.

The apparatus shown in FIG. 1 provides a direct digital value (the counter or code value) related to the illumination intensity. This is in contrast to prior systems in which an analog voltage is sensed and then converted to digital value using an analog-to-digital converter. The simplicity of the system of the present invention compared to prior systems allows for sensors that are both smaller and cheaper.

In FIG. 1, only a single pixel sensor is shown. However, it is envisioned that an array of pixel sensors will be integrated in a single device, such as a CMOS device, may be utilized in conjunction with the present invention. Pixel data memory decoder 116 is used to decode the data from individual pixels sensors and send it to a processor (not shown).

Figure 2:
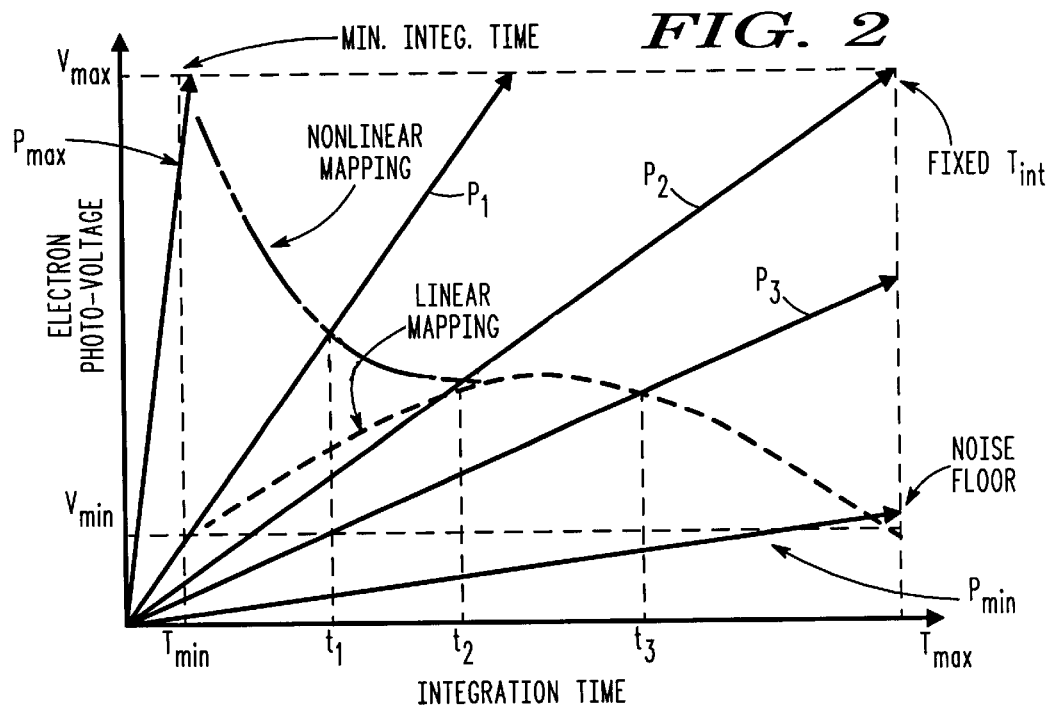
FIG. 2 is a graph of showing photo-voltage as function of integration time for a photodiode sensor, in accordance with an aspect of the present invention.

FIG. 2 is a graph showing photo-voltage as a function of integration time for a photodiode sensor of the present invention. In this embodiment the reference voltage is varied as a function of time. Two examples of the time-variation of the reference voltage are shown in FIG. 2. The first is denoted by the dashed line labeled "Linear Mapping;" the second is denoted by the line labeled "Nonlinear Mapping". "Linear Mapping" may be chosen to provide a linear relationship between the stored digital codes and the power. When Nonlinear Mapping is used the dynamic range of the sensor is maximized. Nonlinear Mapping is used in the examples described below. The line labeled $P_1$ shows the relationship between integration time and photo-voltage for light with optical power $P_1$. In the preferred embodiment, the global counter or code generator (118 in FIG. 1) is set to zero at time t=0. At time $t_1$, the photo-voltage reaches the reference voltage $V_{ref}$, and the output from the comparator (110 in FIG. 1) switches value. At this time, the global counter is latched into the pixel data buffer (114 in FIG. 1). At a later time, the photo-voltage will reach the saturation level $V_{sat}$. The line labeled $P_2$ shows the relationship between integration time and photo-voltage for light with optical power $P_2$, which is less than $P_1$. At time $t_2$, the photo-voltage reaches the reference voltage $V_{ref}$, and the output from the comparator (110 in FIG. 1) switches value. At this time, the global counter is latched into the pixel data buffer (114 in FIG. 1). Thus, when light with a lower optical power falls on the photo-detector, the integration time taken to reach the reference voltage is increased. The integration time taken to reach the reference voltage is therefore inversely proportional to the intensity or the optical power. Similarly, the line labeled $P_3$ shows the relationship between integration time and photo-voltage for light with optical power $P_3$, which is less than $P_1$ or $P_2$. At time $t_3$, the photo-voltage reaches the reference voltage $V_{ref}$, and the global counter value is latched into the pixel data buffer. If the voltage reference is increased, a longer integration time will be required. If the voltage reference is decreased, a shorter integration time will be required. Even when no light is incident upon the photo-detector, small currents and voltages will be present in the sensor because of electrical noise. Voltage levels below the voltage noise floor will be undetectable, so the minimum voltage reference level is determined by the voltage noise floor. There is an upper limit to the amount of charge that can be stored by the capacitor. The voltage corresponding to this maximum charge is called the saturation voltage. The maximum voltage reference level $V_{max}$ is determined by the saturation voltage.

The integration time is inversely proportional to the intensity, and the optical power or intensity is given by:

$$P_i = K\frac{V_{ref}}{t_i}.$$

The integration time $t_i$ may be determined directly from the global counter value if the global counter value is set to zero at the start of the integration time. Otherwise, the integration time may be determined from the difference between the counter value at the end of the integration $N_i$ and the counter value $N_0$ at the start of the integration. The optical power is given by:

$$P_i = C\frac{V_{ref}}{N_i - N_0}$$

where $C = K \times f_{counter}$ is a constant and $f_{counter}$ is the counter frequency. This computation is performed by the processor. Pixel data memory decoder 116 is also used to couple the global counter or code generator 118 to the individual pixel sensors.

The minimum intensity that can be measured is:

$$P_{\min} = K\frac{V_{ref}}{T_{frame}},$$

where $T_{frame}$ is the time between consecutive video frames, or the maximum allowable integration time. Below this intensity, the counter will not be latched within the frame period.

The saturation intensity is:

$$P_{\max} = K\frac{V_{ref}}{T_{clock}},$$

where $T_{clock}$ is the counter period or the minimum allowable integration time. Above this intensity, the counter will be latched in a single counter cycle. Hence, if the voltage is constant, the dynamic range within a single image is:

$$DR = 20 \cdot \log_{10}\left(\frac{T_{frame}}{T_{clock}}\right) dB.$$

The intraframe dynamic range of an image may be adjusted by varying the reference voltage $V_{ref}$ during a single frame. As shown in FIG. 2, to obtain the maximum possible dynamic range $V_{ref}$ may vary such that it equals $V_{max}$ at time equaling $T_{clock}$ and equals $V_{min}$ at time equaling $T_{frame}$. The voltage $V_{ref}$ can be varied using a digital-to-analog converter (DAC) to supply the reference voltage 108. If the maximum reference voltage is $V_{max}$ and the minimum is $V_{min}$, the overall dynamic range is:

$$DR = 20 \cdot \log_{10}\left(\frac{V_{max}T_{frame}}{V_{min}T_{clock}}\right) dB.$$

For example, for a 50 Hz frame rate and a 10 MHz clock, the maximum dynamic range is 106 dB if $V_{ref}$ is constant. If, in addition, the reference voltage is varied in the range 300 $\mu$V–1.5V, and an additional 74 dB of dynamic range is added, this gives a total range of 180 dB.

The accuracy of the sensor is determined by how much the photo-voltage can change within one counter cycle. If the voltage reference is exceeded before the $n^{th}$ counter cycle at time $t=(n-\gamma)T_{clock}$, where $\gamma<1$, the counter value is latched at the value n, and the error in the intensity is given by:

$$\text{error} = K\frac{V_{ref}}{(n-\gamma)T_{clock}} - K\frac{V_{ref}}{nT_{clock}} = K\frac{\gamma V_{ref}}{n(n-\gamma)T_{clock}} = \frac{\gamma P_i}{n}.$$

The relative error is therefore inversely proportional to n. Large intensities will have the largest relative error. The error can be reduced by making n larger. This, in turn, can be achieved by increasing the clock (counter) speed or by raising the reference voltage.

Figure 3:
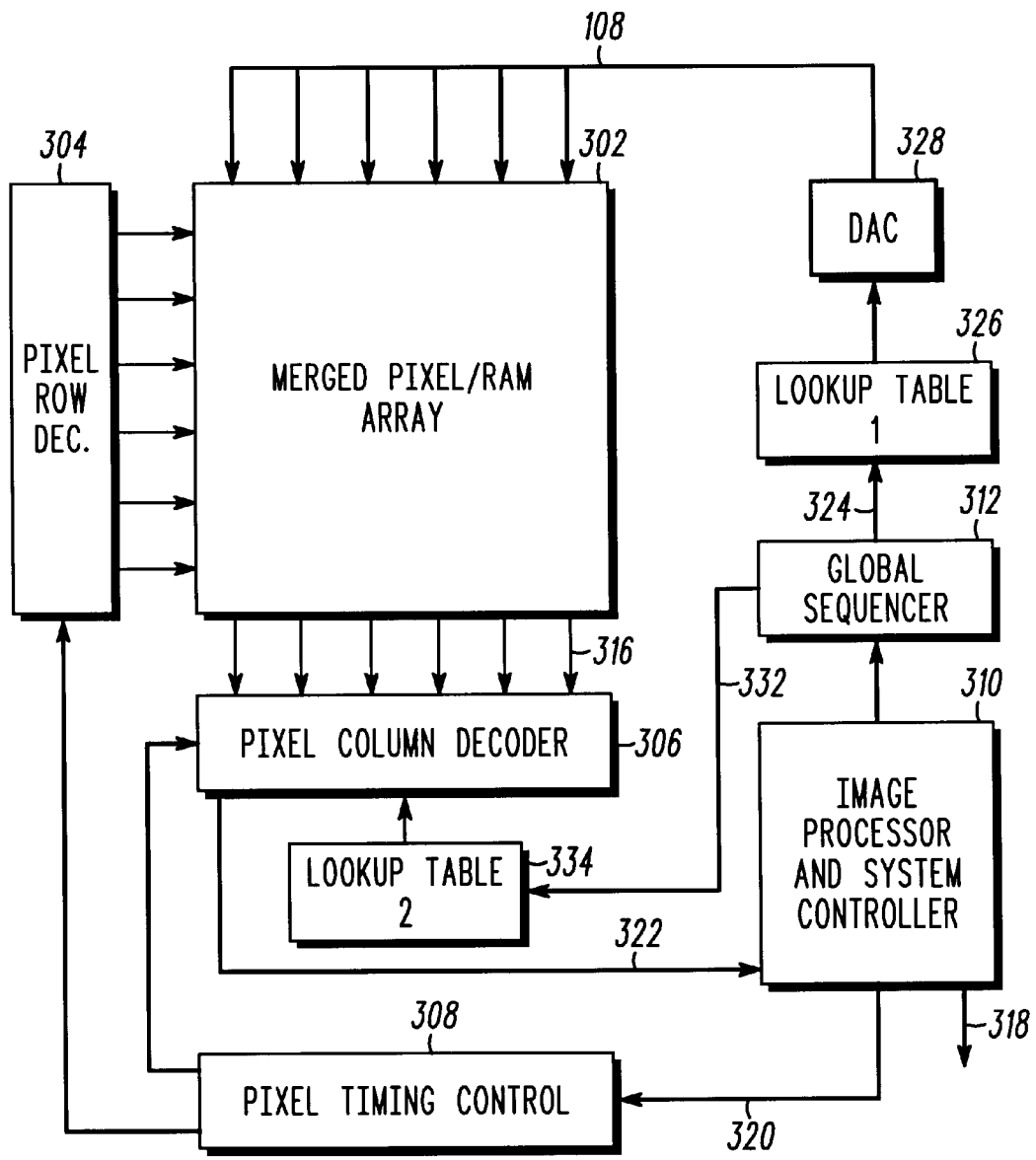
FIG. 3 is a block diagram of a system utilizing a photodiode sensor array, in accordance with an aspect of the present invention.

Referring to FIG. 3, the individual pixel sensors are preferably arranged in an array 302. Each element of the array comprises a photo-detector, a floating diffusion capacitor electrically coupled to the photo-detector and a comparator. The comparator has a first input for receiving a reference voltage, a second input electrically coupled to the floating diffusion capacitor and an output. Each element also includes a pixel data buffer, which may be a random access memory (RAM). The pixel array is addressed in a manner similar to that used to address standard memory (DRAM, SRAM, etc). Each column of pixels is preferably connected to its own data bus. A row address is sent to a pixel row address decoder 304 that selects a particular row of pixels using word lines 314. Pixel column address decoder 306 also includes a data decoder that may be used to receive data from or transmit data to selected columns of pixels, according to the selected row. This allows individual pixels to be addressed, so that data can be "written into" or "read out of" the pixels via pixel bit lines 316. A global sequencer 312 is coupled to the system controller 310. The global sequencer generates lookup table addresses 324 and 334 that are passed to lookup tables 326 and 334. Lookup table 1, 326, is used to convert the lookup table addresses 324 into voltage reference values that are passed to a digital to analog converter (DAC) 328. The DAC 328 in turn generates the reference voltage 108 that is passed to the pixel array 302. Lookup table 2, 334, is used to convert actual counter values into system appropriate digital code values that are passed to the pixels via the pixel column decoder 306. The digital code values need not be linearly related to the actual counter values. The digital code values may correspond to the optical power level associated with each counter value for a given voltage reference. This avoids the need to compute the optical power levels later. In addition, a pixel timing controller 308 is coupled to the row and column decoders to control the timing of access to the individual elements of the array. The pixel bit data is sensed by the column decoder 306 via bit-lines 316 and the data is sent as a multiplexed data stream 322 to the image processor and system controller 310. The image processor performs the conversion from integration time to optical power for each of the pixel sensors and may perform other image processing functions, such as color processing or compression. Data representing the processed image is output from the image processor at 318. The conversion may be performed via a lookup table or via a calculation or by a combination thereof. The system controller, included in 310, provides pixel array timing and control signals 320 that are passed to a pixel timing and control unit 308. The pixel timing and control unit 308 controls the pixel row decoder 304 and the pixel column decoder 306. The system controller, included in 310, also provides control of the global counter or code generator 312.

Figure 4:
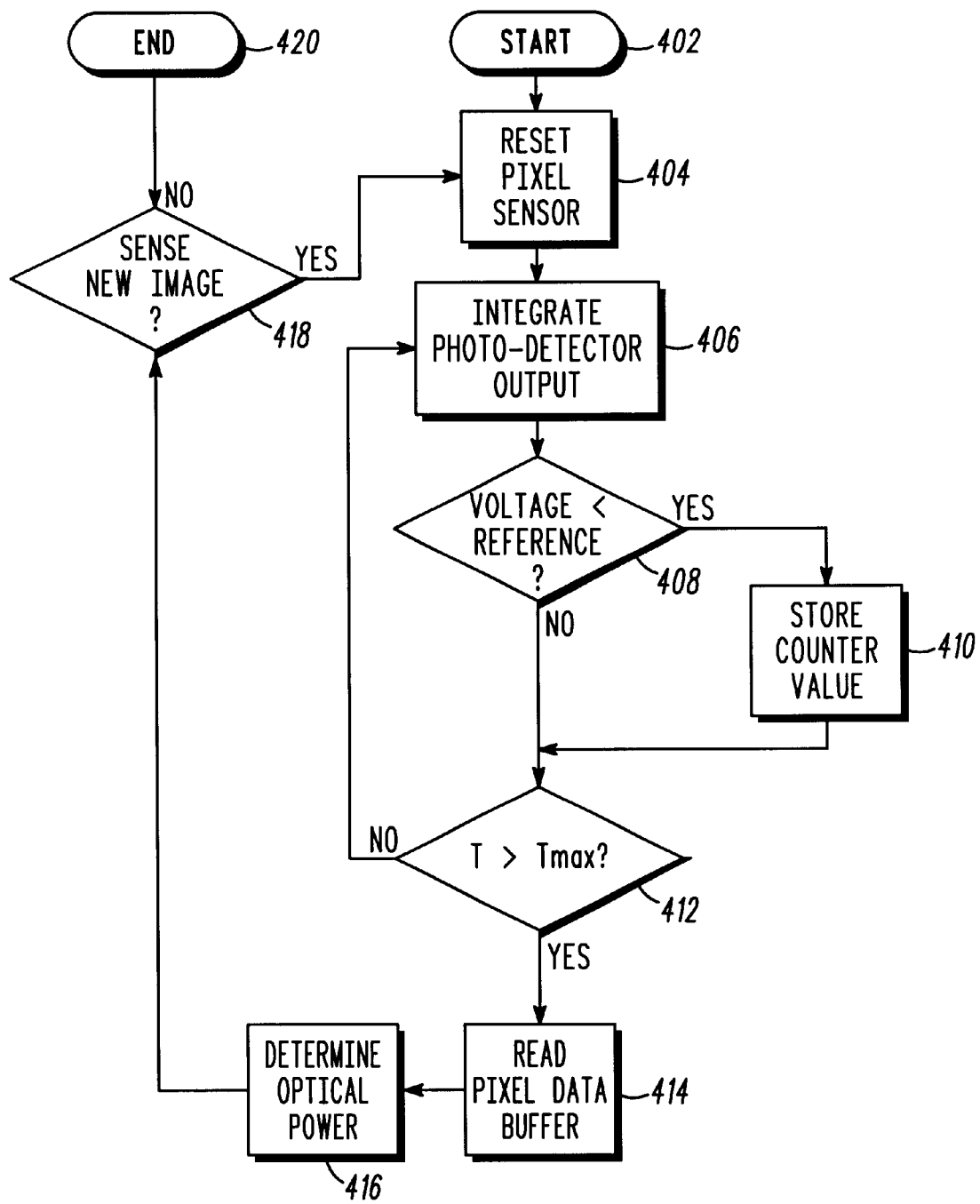
FIG. 4 is a flow chart showing a method of sensing optical power in accordance with the present invention.

A flow chart depicting one embodiment of the method of the current invention is shown in FIG. 4. Operation begins at start block 402. The pixel sensor is reset at block 404, by discharging the floating diffusion capacitor for example. The output from the photo-detector is integrated at block 406. If a floating diffusion capacitor is used, the photo-detector output current is integrated by the capacitor to produce a photo-voltage. At decision block 408 the photo-voltage is compared with a reference voltage. If the photo-voltage is less than the reference voltage as depicted by the positive branch from decision block 408, the current value of a global counter or code generator (which is supplied to the pixel sensor) is stored into a pixel data buffer at block 410. Flow then continues to decision block 412. If the photo-voltage is greater than the reference voltage, as depicted by the negative branch from decision block 408, the flow continues to block 412. Decision block 408 may be implemented as a comparator. Thus the last value stored in the pixel data buffer will be the counter value at which the photo-voltage reaches the reference voltage. The value is thus latched into the pixel data buffer. At decision block 412, a check is made to determine if the maximum time for integration has been exceeded. If the maximum time has been exceeded, as depicted by the positive branch from decision block 412, the pixel data buffer is read. If the maximum time has not been exceeded, as depicted by the negative branch from decision block 412, the system waits until the time has been exceeded. At block 414, the pixel data buffer is read, whether or not the reference voltage has been reached. At block 416, the optical power is determined from the counter value read from the pixel data buffer (or zero if the reference voltage was not reached). This determination may be performed in an integrated processor or in a processor external to the sensor array. The determination may use the calculation:

$$P_i = C \frac{V_{ref}}{N_i - N_0},$$

as described above.

Figure 5:
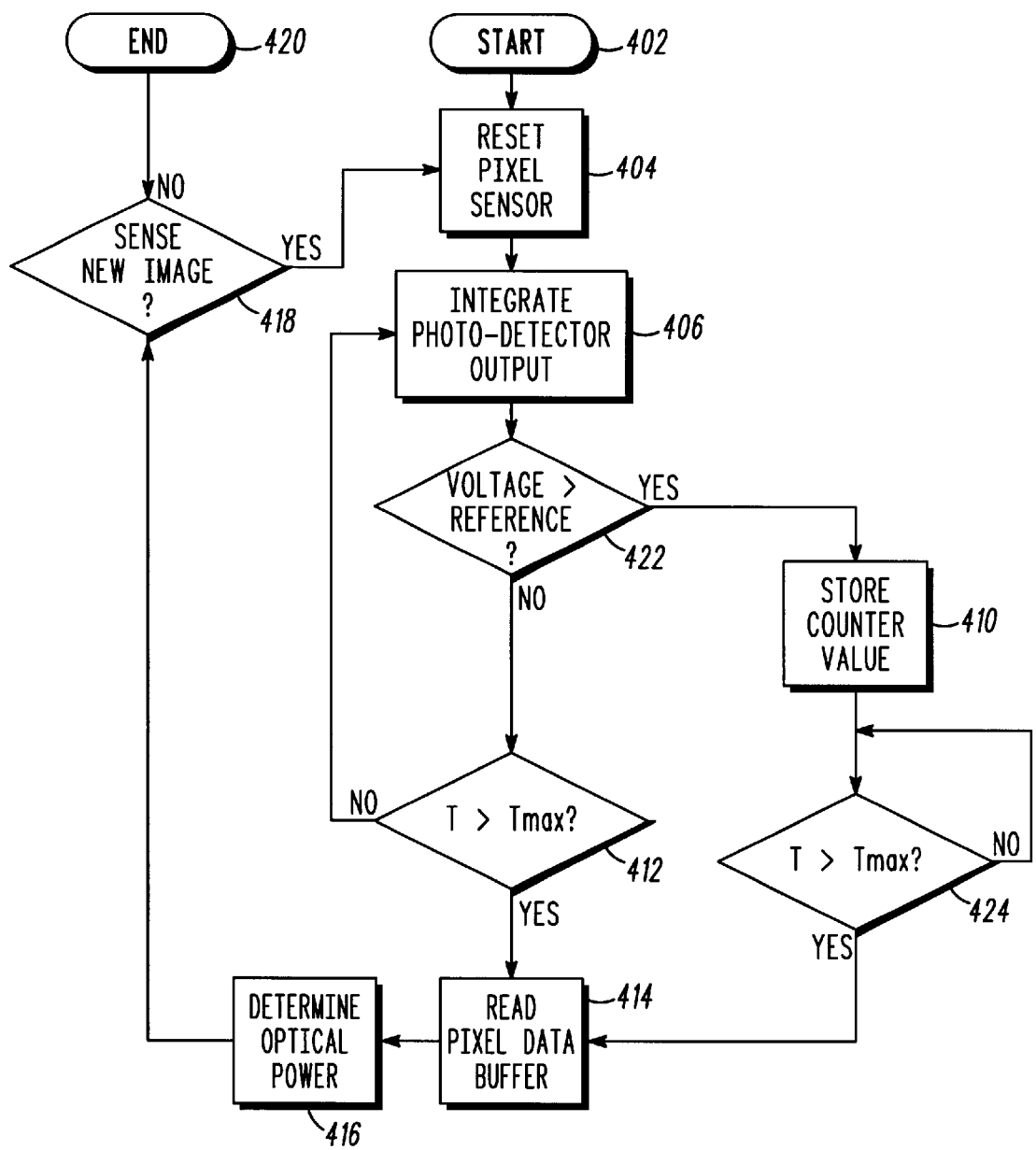
FIG. 5 is a flow chart showing a further method of sensing optical power in accordance with the present invention.

An alternative embodiment of the method of the invention is shown in FIG. 5. Operation begins at start block 402. The pixel sensor is reset at block 404, by discharging the floating diffusion capacitor for example. The output from the photo-detector is integrated at block 406. If a floating diffusion capacitor is used, the photo-detector output current is integrated by the capacitor to produce a photo-voltage. At decision block 422 the photo-voltage is compared with a reference voltage. If the photo-voltage is greater than the reference voltage as depicted by the positive branch from decision block 423, the current value of a global counter (which is supplied to the pixel sensor) is stored into a pixel data buffer at block 410. At decision block 424, a check is made to determine if the maximum time for integration has been exceeded. If the maximum time has been exceeded, as depicted by the positive branch from decision block 412, the pixel data buffer is read at block 414. If the maximum time has not been exceeded, as depicted by the negative branch from decision block 424, the system waits until the time has been exceeded. If the photo-voltage is less than the reference voltage, as depicted by the negative branch from decision block 422, flow continues to block 412. Decision block 408 may be implemented as a comparator. Thus the value stored in the pixel data buffer will be the counter value at which the photo-voltage reaches the reference voltage. At decision block 412, a check is made to determine if the maximum time for integration has been exceeded. If the maximum time has been exceeded, as depicted by the positive branch from decision block 412, the pixel data buffer is read. If the maximum time has not been exceeded, as depicted by the negative branch from decision block 412, the system waits until the time has been exceeded. At block 414, the pixel data buffer is read, whether or not the reference voltage has been reached. At block 416, the optical power is determined from the counter value read from the pixel data buffer (or zero if the reference voltage was not reached). The calculation may be performed by use of a lookup table indexed by the counter difference $N_i - N_0$, or indexed by the integration time calculated from the counter difference.

Figure 6:
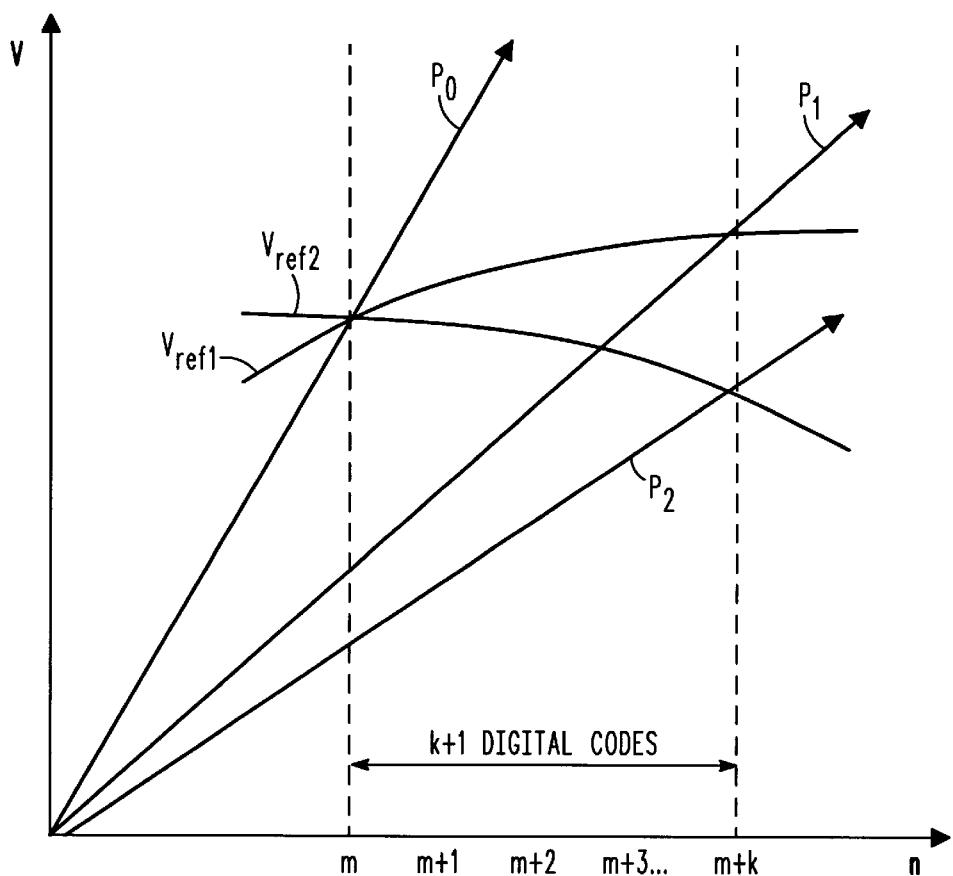
FIG. 6 is a graph showing photo-voltage as function of integration time for a photodiode sensor, in accordance with an aspect of the present invention.

Another benefit of varying $V_{ref}$ during the frame is the capability of changing the range of light intensity levels accessed by a specific set of successive digital codes representing integration times. This allows the sensitivity of the sensor to be changed. This is accomplished by decreasing or increasing the average slope of $V_{ref}$ for that set of codes to, respectively, increase or decrease the range of accessible intensity levels. This is illustrated in FIG. 6. FIG. 6 shows a graph of voltage as a function of integration time. The integration time is represented by a digital code denoted by the variable n. Light with intensity $P_0$ reaches the reference voltage $V_{ref1}$ or $V_{ref2}$ at a time denoted by the digital code m. If the voltage reference is varied as a function of time in accordance with the curve $V_{ref1}(n)$, light with intensity $P_1$ reaches the reference voltage $V_{ref1}(m+k)$ at a time denoted by the digital code m+k,. On the other hand, if the voltage reference is varied as a function of time in accordance with the curve $V_{ref2}(n)$, light with intensity $P_2$ reaches the reference voltage $V_{ref2}(m+k)$ at a time denoted by the digital code m+k. Hence, if the voltage reference is varied as a function of time in accordance with the curve $V_{ref1}(n)$, the digital codes m to m+k represent light with intensities from $P_1$ to $P_0$, while if the voltage reference is varied as a function of time in accordance with the curve $V_{ref2}(n)$, the digital codes m to m+k represent light with intensities from $P_2$ to $P_0$. The average slope of the curve $V_{ref1}(n)$ is greater than that of $V_{ref2}(n)$, and consequently the sensitivity of a sensor using voltage reference function $V_{ref1}(n)$ will be higher.

Those of ordinary skill in the art will recognize that the present invention has been described in terms of exemplary embodiments based upon use of a capacitor to integrate the photo-detector output and a comparator to latch the global counter value into a pixel data buffer. However, the invention should not be so limited, since the present invention could be implemented using hardware or software component equivalents to those described and claimed. Many other variations will also be evident to those of ordinary skill in the art.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A time-integrating pixel sensor comprising:

a photo-detector;

a capacitive element electrically coupled to the photo-detector;

a comparator element having a first input for receiving a reference voltage, a second input electrically coupled to the capacitive element and an output;

a pixel data buffer responsive to the comparator output and operable to store a digital code value, a voltage reference supply element, electrically coupled to the first input of said comparator and operable to supply the reference voltage thereto; and a global code generator, coupled to said pixel data buffer and operable to supply the digital code value thereto; and a processor operably coupled to said pixel data buffer and operable to convert said digital code value to an optical power level, wherein said processor calculates the optical power level P in accordance with $$P = C \frac{V_{ref}}{N - N_0},$$

where C is a constant, $V_{ref}$ is the reference voltage, N is the digital code value stored in the pixel data buffer, and $N_0$ is an initial digital code value.

2. A method for sensing the optical power of light falling on a photo-detector having an input for receiving light and an electrical output, comprising:

operating a global code generator;

integrating the electrical output of the photo-detector to obtain a photo-voltage;

comparing said photo-voltage with a reference voltage;

storing the value of said global code generator into a pixel data buffer when said photo-voltage exceeds said reference voltage; and wherein said determining further comprises: reading the value of the global code generator stored into said pixel data buffer; and calculating the optical power P in accordance with $$P = K \frac{V_{ref}}{t},$$

where K is a constant, $V_{ref}$ is the reference voltage and t is an integration time determined from the value of the global code generator.

3. A method for sensing the optical power of light falling on a photo-detector having an input for receiving light and an electrical output, comprising:

operating a global code generator to obtain a global code value;

integrating the electrical output of the photo-detector to obtain a photo-voltage;

determining a reference voltage value from said global code value;

generating reference voltage in accordance with said reference voltage value;

determining a digital code value from said global code value;

comparing said photo-voltage with said reference voltage;

storing said digital code value into a pixel data buffer if said photo-voltage is greater than said reference voltage; and determining the optical power from the digital code value stored into said pixel data buffer, wherein said reference voltage value is selected such that the optical power of the light falling on the photo-detector is proportional to the digital code value stored into said pixel data buffer.

4. A method for sensing the optical power of light falling on a photo-detector having an input for receiving light and an electrical output, comprising:

operating a global code generator to obtain a global code value;

integrating the electrical output of the photo-detector to obtain a photo-voltage;

determining a reference voltage value from said global code value;

generating reference voltage in accordance with said reference voltage value;

determining a digital code value from said global code value;

comparing said photo-voltage with said reference voltage;

storing said digital code value into a pixel data buffer if said photo-voltage is greater than said reference voltage; and determining the optical power from the digital code value stored into said pixel data buffer, wherein said digital code value stored into said pixel data buffer is proportional to the optical power of light falling on the photo-detector.

5. A method for sensing the optical power of light falling on an array of pixel sensors, each sensor having a pixel data buffer and a photo-detector with an input for receiving light and an electrical output, said method comprising for each pixel sensor of the array of pixel sensors:

integrating the electrical output of the photo-detector to obtain a photo-voltage;

measuring an integration time as the time taken for said photo-voltage to reach a reference voltage; and determining the optical power from said integration time, wherein said measuring comprises:

running a global code generator; and for each pixel sensor of the array of pixel sensors, comparing said photo-voltage with a reference voltage; and storing the value of said global code generator into a pixel data buffer if said photo-voltage is greater than said reference voltage, wherein said determining further comprises:

decoding a row and column address of a pixel data buffer in said array;

reading the stored value of the global code generator from the pixel data buffer at said row and column address; and indexing a lookup table by the difference between the stored value of the global code generator and an initial value of the global code generator.

6. A method for sensing the optical power of light falling on an array of pixel sensors, each sensor having a pixel data buffer and a photo-detector with an input for receiving light and an electrical output, said method comprising for each pixel sensor of the array of pixel sensors:

integrating the electrical output of the photo-detector to obtain a photo-voltage;

measuring an integration time as the time taken for said photo-voltage to reach a reference voltage; and determining the optical power from said integration time, wherein said measuring comprises:

running a global code generator; and for each pixel sensor of the array of pixel sensors, comparing said photo-voltage with a reference voltage; and storing the value of said global code generator into a pixel data buffer if said photo-voltage is greater than said reference voltage, wherein said determining further comprises:

decoding a row and column address of a pixel data buffer in said array;

reading the stored value of the global code generator from said pixel data buffer; and calculating the optical power P in accordance with $$P = C \frac{V_{ref}}{N - N_0},$$

where C is a constant, $V_{ref}$ is the reference voltage, N is the stored value of the global counter, and $N_0$ is an initial value of the global code generator.

* * * * *